(12) United States Patent
Lee et al.

(10) Patent No.: US 9,045,075 B2
(45) Date of Patent: Jun. 2, 2015

(54) VEHICLE ASSISTANCE DEVICE AND METHOD

(71) Applicant: Zhongshan Innocloud Intellectual Property Services Co., Ltd., Zhongshan (CN)

(72) Inventors: Hou-Hsien Lee, New Taipei (TW); Chang-Jung Lee, New Taipei (TW); Chih-Ping Lo, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 0 days.

(21) Appl. No.: 14/108,157

(22) Filed: Dec. 16, 2013

(65) Prior Publication Data

US 2014/0324285 A1 Oct. 30, 2014

(30) Foreign Application Priority Data

Apr. 29, 2013 (TW) .............................. 102115198 U

(51) Int. Cl.
*B60Q 1/00* (2006.01)

(52) U.S. Cl.
CPC ........................ *B60Q 1/00* (2013.01)

(58) Field of Classification Search
CPC ........................................................ B60Q 1/00
USPC ........................................................... 701/36
See application file for complete search history.

(56) References Cited

U.S. PATENT DOCUMENTS

| 5,796,094 A * | 8/1998 | Schofield et al. ........... 250/208.1 |
| 2009/0072124 A1* | 3/2009 | Schofield et al. ........... 250/208.1 |
| 2012/0081544 A1* | 4/2012 | Wee .............................. 348/140 |
| 2014/0156172 A1* | 6/2014 | Surnilla et al. ............... 701/104 |
| 2014/0313335 A1* | 10/2014 | Koravadi ..................... 348/148 |
| 2014/0324285 A1* | 10/2014 | Lee et al. ........................ 701/36 |
| 2014/0327774 A1* | 11/2014 | Lu et al. ........................ 348/148 |
| 2014/0333729 A1* | 11/2014 | Pflug .............................. 348/47 |
| 2014/0333770 A1* | 11/2014 | Baur ............................. 348/148 |
| 2014/0347486 A1* | 11/2014 | Okouneva ..................... 348/148 |
| 2014/0368656 A1* | 12/2014 | Hayakawa et al. ........... 348/148 |

* cited by examiner

*Primary Examiner* — Mary Cheung
*Assistant Examiner* — Frederick Brushaber
(74) *Attorney, Agent, or Firm* — Novak Druce Connolly Bove + Quigg LLP

(57) ABSTRACT

An example of a vehicle assistance method includes obtaining a surroundings image captured by at least one camera. The method then controls a converting unit to convert the obtained surroundings image into a birds-eye view. Next, the method determines a panorama area according to a rightmost road marker or a leftmost road marker, determines a detection area according to whether or not one or more road markers exclusive the rightmost road marker and the leftmost road marker appear in the panorama area, and further determine whether one or more objects appear in the detection area. If yes, the method then obtains the humidity of air detected by a humidity sensor. Next, the method determines a camera corresponding to the birds-eye view when the obtained humidity of air is greater than the preset humidity value, and controls a driving device to turn on a pair of lights.

20 Claims, 4 Drawing Sheets

VEHICLE ASSISTANCE DEVICE AND METHOD

BACKGROUND

1. Related Applications

This application is related to U.S. patent application Ser. No. 14/108,152 and a title of VEHICLE ASSISTANCE DEVICE AND METHOD, which has the same assignee as the current application and was concurrently filed.

2. Technical Field

The present disclosure relates to vehicle assistance devices, and particularly, to a vehicle assistance device capable of automatically turning on lights of a vehicle.

3. Description of Related Art

Usually, a driver will determine whether to turn on the lights of a vehicle when the humidity of air is greater than a preset humidity value. However, to turn on the lights of the vehicle, a manual action is required by the driver. Accordingly, there is a need for a new vehicle assistance device to resolve the above problems.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

The embodiments of the present disclosure are now described in detail, with reference to the accompanying drawings.

Figure 1:
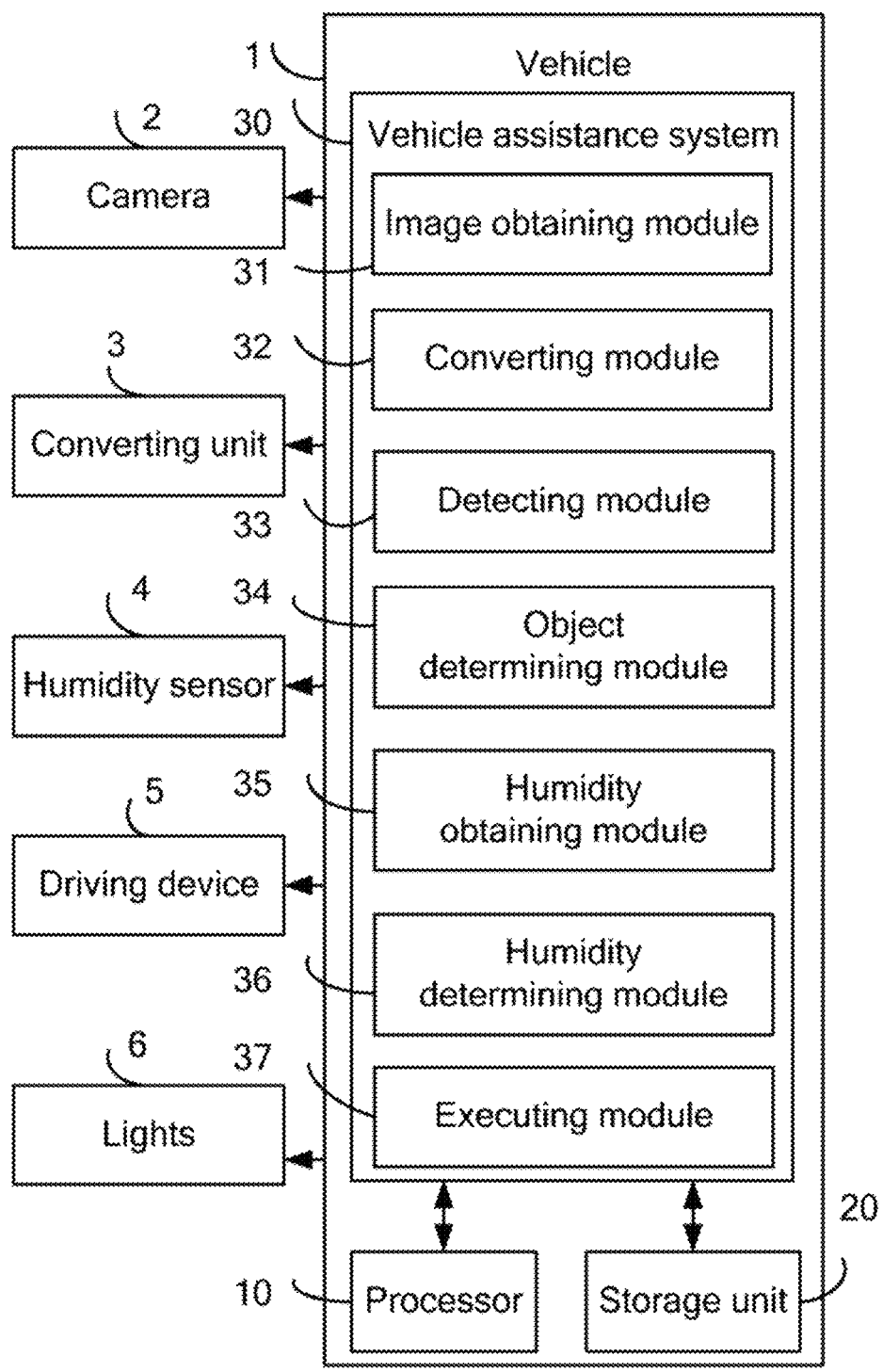
FIG. 1 is a schematic diagram illustrating a vehicle assistance device connected with at least one camera, a converting unit, a humidity sensor, a driving device, and at least one pair of lights in accordance with an exemplary embodiment.

FIG. 1 is a schematic diagram illustrating a vehicle assistance device 1. The vehicle assistance device 1 is applied to a vehicle. The vehicle assistance device 1 is connected to at least one camera 2, a converting unit 3, a humidity sensor 4, a driving device 5, and at least one pair of lights 6. The vehicle assistance device 1 can control the converting unit 3 to convert at least one surroundings image captured by the at least one camera 2 into a birds-eye view, to determine a detection area. Then, determine whether or not one or more objects appear in the detection area. In addition, control the driving device 5 to turn on the at least one pair of lights 6 when one or more objects appear in the detection area and the humidity detected by the humidity sensor 4 is greater than a preset humidity value, to increase the visibility of the driver.

In the embodiment, the number of cameras 2 is two. The cameras 2 are respectively arranged on the front and the rear of the vehicle, respectively capture the surroundings in the front and in the rear of the vehicle, and respectively generate surroundings images. In other embodiments, the number of the cameras 2 is four, and respectively arranged on the front, the left side, the right side, and the rear of the vehicle to capture the surroundings 360 degrees around the vehicle.

Figure 2:
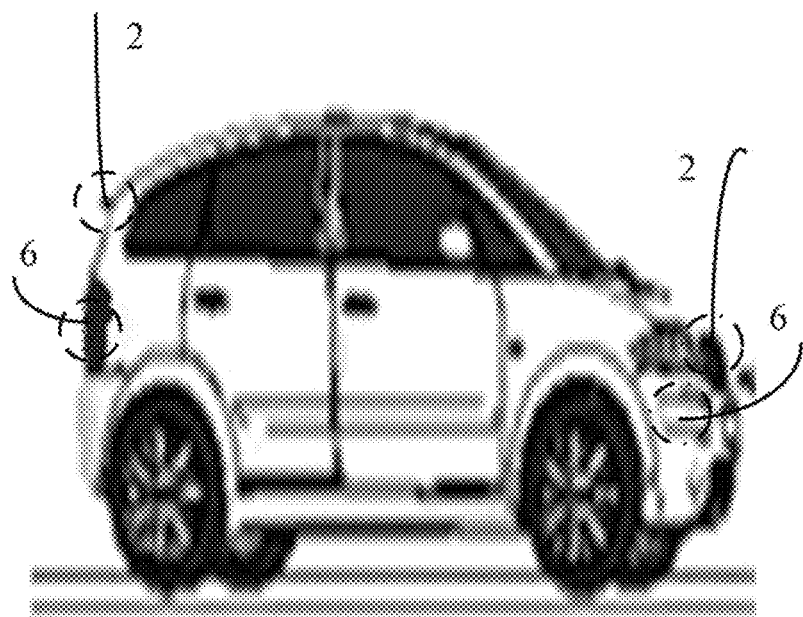
FIG. 2 shows an arrangement of the at least one camera and the at least one light on a vehicle.

Each captured surroundings image includes distance information indicating the distance between one camera 2 and any object in the field of view of the camera 2. In the embodiment, the camera 2 is a Time of Flight (TOF) camera. In the embodiment, there are two pairs of lights 6 arranged on the front and the back of the vehicle. The surroundings image captured by each camera 3 can be used to control the turning on of one pair of lights 6. For example, in FIG. 2, the surroundings image captured by the camera 3 circled by dotted line can be used to control the on of the pair of lights 6 circled by dotted line, in addition, the surroundings image captured by the camera 3 circled by broken line can be used to control the on of the pair of lights 6 circled by broken line.

The vehicle assistance device 1 including a processor 10, a storage unit 20, and a vehicle assistance system 30. In the embodiment, the vehicle assistance system 30 includes an image obtaining module 31, a converting module 32, a detecting module 33, an object determining module 34, a humidity obtaining module 35, a humidity determining module 36, and an executing module 37. One or more programs of the above function modules may be stored in the storage unit 20 and executed by the processor 10. In general, the word "module", as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

The image obtaining module 31 obtains a surroundings image captured by each camera 2.

The converting module 32 controls the converting unit 3 to convert the obtained surroundings image captured by each camera 2 into a birds-eye view corresponding to each camera 2. The method that the converting unit 32 converts the surroundings image into the birds-eye view is known in the art, and it is not described in detailed herein.

The detecting module 33 determines whether or not a rightmost road marker or a leftmost road marker appears in at least one birds-eye view. In the embodiment, the rightmost road marker is the road marker, which is the rightmost in all road markers of the birds-eye view, such as the object labeled by 111 in FIG. 3. The leftmost road marker is the road marker, which is the leftmost in all road markers of the birds-eye view, such as the object labeled by 112 in FIG. 3.

The object determining module 34 determines a panorama area according to at least the rightmost road marker or the leftmost road marker when a rightmost road marker or a leftmost road marker appears in at least one birds-eye view. Then, determines a detection area of the at least one birds-eye view according to whether or not one or more road markers exclusive the rightmost road marker and the leftmost road marker (hereinafter exclusive road marker) appear in the panorama area. The object determining module 34 further compares the distance information of each two adjacent pixels of the detection area, determines a distance difference between the distances indicated by the two adjacent pixels is more than a preset range, and further determines whether or not the number of the determined two adjacent pixels is more than a preset value. When the number of the determined two adjacent pixels is more than the preset value, the object determining module 34 determines that one or more objects appear in the detection area of the at least one birds-eye view. When the number of the determined two adjacent pixels is less than the preset value, the object determining module 34 determines that no object appears in the detection area of the at least one birds-eye view. Accordingly, the object determining module 34 determines whether or not one or more objects exclusive the road marker appear in the road of the at least one birds-eye view.

Figure 3:
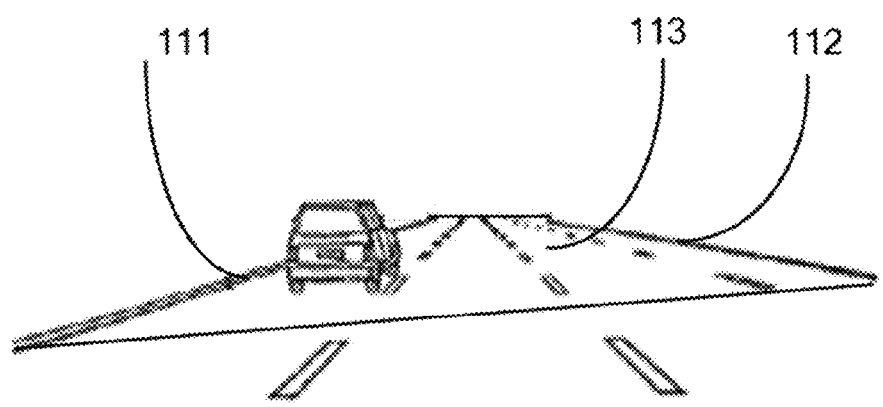
FIG. 3 is a schematic view showing the surroundings image captured by the at least one camera.

In detail, FIG. 3 shows that when the rightmost road marker and the leftmost road marker appear in at least one birds-eye view, the object determining module 34 determines a geometry 113 constructed by the rightmost road marker, the leftmost road marker, and two lines connected between the rightmost road marker and the leftmost road marker, and determines the area of the geometry 113. In addition, determines a side perpendicular to the geometry 113, determines a high of the side, and further determines that the panorama area is equal to the area of the geometry 113 multiplied by the high of the side. When the rightmost road marker appears in at least one birds-eye view, the object determining module 34 determines a geometry 113 constructed by the rightmost road marker, the leftmost side of the birds-eye view, and two lines connected between the rightmost road marker and the leftmost side of the birds-eye view, and determines the area of the geometry 113. In addition, determines a side perpendicular to the geometry 113, determines a high of the side, and further determines that the panorama area is equal to the area of the geometry 113 multiplied by the high of the side. When the leftmost road marker appears in at least one birds-eye view, the object determining module 34 determines a geometry 113 constructed by the leftmost road marker, the rightmost side of the birds-eye view, and two lines connected between the leftmost road marker and the rightmost side of the birds-eye view, and determines the area of the geometry 113. In addition, determines a side perpendicular to the geometry 113, determines a high of the side, and further determines that the panorama area is equal to the area of the geometry 113 multiplied by the high of the side.

When one or more exclusive road marks appear in the panorama view, the object determining module 34 determines that the detection area is the panorama view without the one or more exclusive road marks. When no exclusive road mark appears in the panorama view, the object determining module 34 determines that the detection area is the panorama view.

The humidity obtaining module 35 obtains the humidity of the air detected by the humidity sensor 4 when one or more objects appear in the detection area.

The humidity determining module 36 determines whether or not the obtained humidity of the air is greater than the preset humidity value.

The executing module 37 determines the at least one birds-eye view when the obtained humidity of the air is greater than the preset humidity value. Then, determines at least one camera 2 corresponding to the at least one birds-eye view, and controls the driving device 5 to turn on at least one pair of lights 6 corresponding to the determined at least one camera 2.

Figure 4:
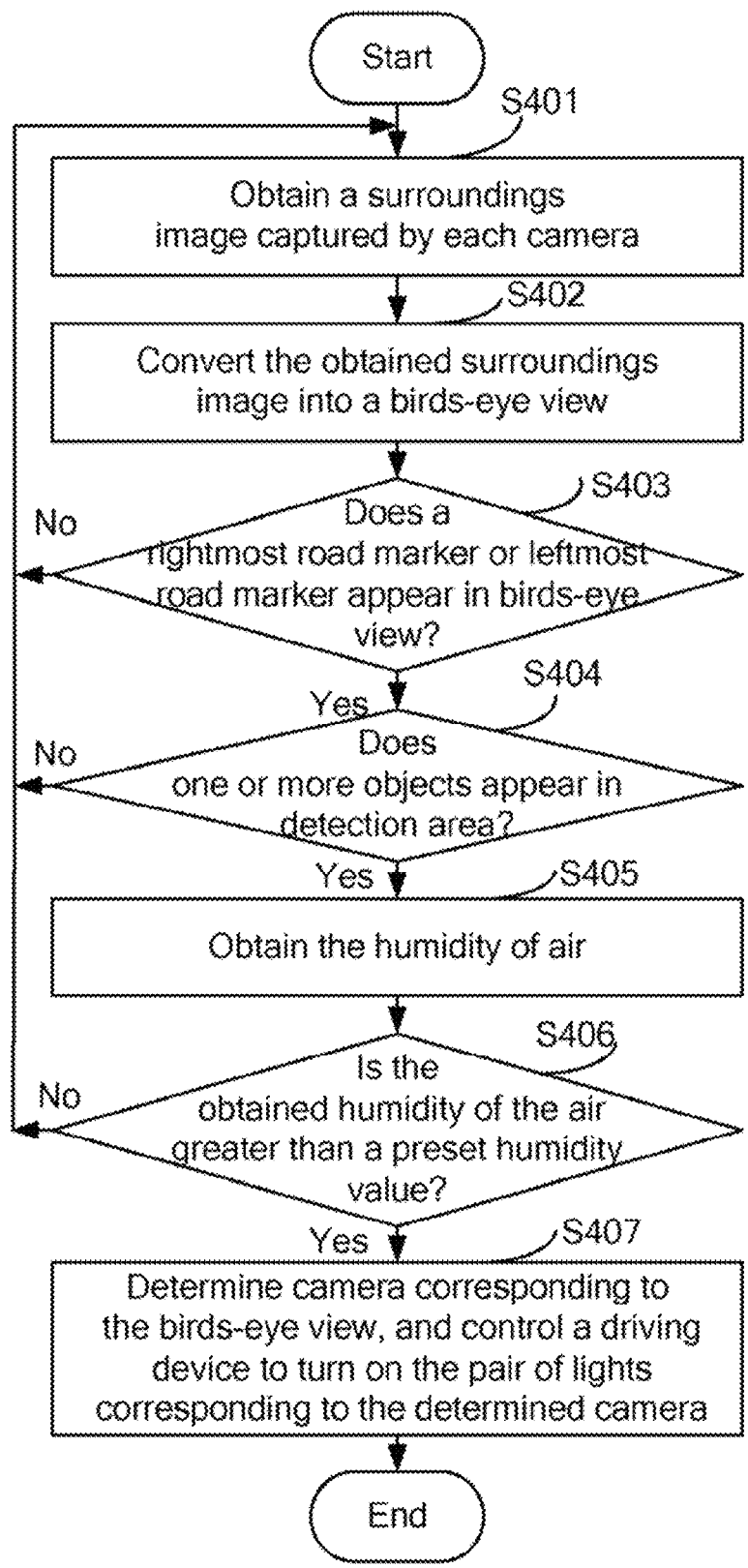
FIG. 4 is a flowchart of a vehicle assistance method in accordance with an exemplary embodiment.

FIG. 4 shows a vehicle assistance method in accordance with an exemplary embodiment.

In step S401, the image obtaining module 31 obtains a surroundings image captured by each camera 2.

In step S402, the image converting module 32 controls the converting unit 3 to convert the obtained surroundings image captured by each camera 2 into a birds-eye view corresponding to each camera 2.

In step S403, the detecting module 33 determines whether or not a rightmost road marker or a leftmost road marker appears in at least one birds-eye view. In the embodiment, the rightmost road marker is the road marker, which is the rightmost in all road markers of the birds-eye view. The leftmost road marker is the road marker, which is the leftmost in all road markers of the birds-eye view. If the rightmost road marker or the leftmost road marker appears in at least one birds-eye view, the procedure goes to step S404. If the rightmost road marker or the leftmost road marker does not appear in at least one birds-eye view, the procedure goes to step S401.

In step S404, the object determining module 34 determines a panorama area according to at least the rightmost road marker or the leftmost road marker. Then, determines a detection area of the at least one birds-eye view according to whether or not one or more road markers exclusive the rightmost road marker and the leftmost road marker (hereinafter exclusive road marker) appear in the panorama area. In addition, compares the distance information of each two adjacent pixels of the detection area, determines a distance difference between the distances indicated by the two adjacent pixels is more than a preset range, and further determines whether or not the number of the determined two adjacent pixels is more than a preset value. If the number of the determined two adjacent pixels is more than the preset value, the object determining module 34 determines that one or more objects appear in the detection area of the at least one birds-eye view, the procedure goes to step S405. If the number of the determined two adjacent pixels is less than the preset value, the object determining module 34 determines no object appears in the detection area of the at least one birds-eye view, the procedure goes to step S401.

In step S405, the humidity obtaining module 35 obtains the humidity of air detected by the humidity sensor 4.

In step S406, the humidity determining module 36 determines whether or not the obtained humidity of the air is greater than a preset humidity value. If the obtained humidity of the air is greater than the preset humidity value, the procedure goes to step S407. If the obtained humidity of the air is less than the preset humidity value, the procedure goes to step S401.

In step S407, the executing module 37 determines the at least one birds-eye view, determines at least one camera 2 corresponding to the at least one birds-eye view, and controls the driving device 5 to turn on at least one pair of lights 6 corresponding to the determined at least one camera 2.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A vehicle assistance device comprising:
   a storage system;
   a processor;
   one or more programs stored in the storage system, executable by the processor, the one or more programs comprising:
   an image obtaining module operable to obtain a surroundings image captured by at least one camera, each of the at least one surroundings image comprising a distance information indicating distances between the corresponding camera and each object captured by the corresponding camera;
   a converting module operable to control a converting unit to convert the obtained surroundings image captured by each of the at least one camera into a birds-eye view corresponding to each of the at least one camera;
   a detecting module operable to determine whether or not a rightmost road marker or a leftmost road marker appears in at least one birds-eye view;

an object determining module operable to determine a panorama area according to at least the rightmost road marker or the leftmost road marker when a rightmost road marker or a leftmost road marker appears in at least one birds-eye view, determine a detection area of the at least one birds-eye view according to whether or not one or more road markers exclusive the rightmost road marker and the leftmost road marker appear in the panorama area, compare the distance information of each two adjacent pixels of the detection area, determine a distance difference between the distances indicated by the two adjacent pixels is more than a preset range, and further determine whether or not the number of the determined two adjacent pixels is more than a preset value, to determine whether or not one or more objects appear in the detection area of the at least one birds-eye view;

a humidity obtaining module operable to obtain the humidity of air detected by a humidity sensor when one or more objects appear in the detection area of the at least one birds-eye view; and an executing module operable to determine the at least one birds-eye view when the obtained humidity of air is greater than the preset humidity value, determine at least one camera corresponding to the at least one birds-eye view, and control a driving device to turn on at least one pair of lights corresponding to the determined at least one camera.

2. The vehicle assistance device as described in claim 1, wherein when the rightmost road marker and the leftmost road marker appear in at least one birds-eye view, the object determining module is operable to determine a geometry constructed by the rightmost road marker, the leftmost road marker, and two lines connected between the rightmost road marker and the leftmost road marker, determine the area of the geometry, determine a side perpendicular to the geometry, determine a high of the side, and further determine that the panorama area is equal to the area of the geometry multiplied by the high of the side.

3. The vehicle assistance device as described in claim 1, wherein when the rightmost road marker appears in at least one birds-eye view, the object determining module is operable to determine a geometry constructed by the rightmost road marker, the leftmost side of the birds-eye view, and two lines connected between the rightmost road marker and the leftmost side of the birds-eye view, determine the area of the geometry, determine a side perpendicular to the geometry, determine a high of the side, and further determine that the panorama area is equal to the area of the geometry multiplied by the high of the side.

4. The vehicle assistance device as described in claim 1, wherein when the leftmost road marker appears in at least one birds-eye view, the object determining module is operable to determine a geometry constructed by the leftmost road marker, the rightmost side of the birds-eye view, and two lines connected between the leftmost road marker and the rightmost side of the birds-eye view, determine the area of the geometry, determine a side perpendicular to the geometry, determine a high of the side, and further determine that the panorama area is equal to the area of the geometry multiplied by the high of the side.

5. The vehicle assistance device as described in claim 1, wherein when one or more road marks exclusive the rightmost road marker and the leftmost road marker appear in the panorama view, the object determining module is operable to determine that the detection area of the at least one birds-eye view is the panorama view without the one or more road marks exclusive the rightmost road marker and the leftmost road marker.

6. The vehicle assistance device as described in claim 1, wherein when no road mark exclusive the rightmost road marker and the leftmost road marker appears in the panorama view, the object determining module is operable to determine that the detection area is the panorama view.

7. The vehicle assistance device as described in claim 1, wherein the rightmost road marker is the road marker which is the rightmost in all road markers of the birds-eye view; and the leftmost road marker is the road marker which is the leftmost in all road markers of the birds-eye view.

8. A vehicle assistance method comprising:
obtaining a surroundings image captured by at least one camera, each of the at least one surroundings image comprising a distance information indicating distances between the corresponding camera and each object captured by the corresponding camera;

controlling a converting unit to convert the obtained surroundings image captured by each of the at least one camera into a birds-eye view corresponding to each of the at least one camera;

determining whether or not a rightmost road marker or a leftmost road marker appears in at least one birds-eye view;

determining a panorama area according to at least the rightmost road marker or the leftmost road marker when a rightmost road marker or a leftmost road marker appears in at least one birds-eye view, determining a detection area of the at least one birds-eye view according to whether or not one or more road markers exclusive the rightmost road marker and the leftmost road marker appear in the panorama area; comparing the distance information of each two adjacent pixels of the detection area, determining a distance difference between the distances indicated by the two adjacent pixels is more than a preset range, and further determining whether or not the number of the determined two adjacent pixels is more than a preset value, to determine whether or not one or more objects appear in the detection area of the at least one birds-eye view;

obtaining the humidity of air detected by a humidity sensor when one or more objects appear in the detection area of the at least one birds-eye view; and determining the at least one birds-eye view when the obtained humidity of air is greater than the preset humidity value, determine at least one camera corresponding to the at least one birds-eye view, and controlling a driving device to turn on at least one pair of lights corresponding to the determined at least one camera.

9. The vehicle assistance method as described in claim 8, wherein the method further comprises:
determining a geometry constructed by the rightmost road marker, the leftmost road marker, and two lines connected between the rightmost road marker and the leftmost road marker when the rightmost road marker and the leftmost road marker appear in at least one birds-eye view, determining the area of the geometry; determining a side perpendicular to the geometry, determining a high of the side, and further determining that the panorama area is equal to the area of the geometry multiplied by the high of the side.

10. The vehicle assistance method as described in claim 8, wherein the method further comprises:
determining a geometry constructed by the rightmost road marker, the leftmost side of the birds-eye view, and two lines connected between the rightmost road marker and the leftmost side of the birds-eye view when the rightmost road marker appears in at least one birds-eye view, determining the area of the geometry; determine a side perpendicular to the geometry, determining a high of the side, and further determining that the panorama area is equal to the area of the geometry multiplied by the high of the side.

11. The vehicle assistance method as described in claim 8, wherein the method further comprises:
   determining a geometry constructed by the leftmost road marker, the rightmost side of the birds-eye view, and two lines connected between the leftmost road marker and the rightmost side of the birds-eye view when the leftmost road marker appears in at least one birds-eye view, determining the area of the geometry; determining a side perpendicular to the geometry, determine a high of the side, and further determining that the panorama area is equal to the area of the geometry multiplied by the high of the side.

12. The vehicle assistance method as described in claim 8, wherein the method further comprises:
   determining that the detection area of the at least one birds-eye view is the panorama view without the one or more road marks exclusive the rightmost road marker and the leftmost road marker when one or more road marks exclusive the rightmost road marker and the leftmost road marker appears in the panorama view.

13. The vehicle assistance method as described in claim 8, wherein the method further comprises:
   determining that the detection area of the at least one birds-eye view is the panorama view when no road mark exclusive the rightmost road marker and the leftmost road marker appears in the panorama view.

14. The vehicle assistance method as described in claim 8, wherein the rightmost road marker is the road marker which is the rightmost in all road markers of the birds-eye view; and the leftmost road marker is the road marker which is the leftmost in all road markers of the birds-eye view.

15. A storage medium storing a set of instructions, the set of instructions capable of being executed by a processor of a vehicle assistance device, cause the vehicle assistance device to perform a vehicle assistance method, the method comprising:
   obtaining a surroundings image captured by at least one camera, each of the at least one surroundings image comprising a distance information indicating distances between the corresponding camera and each object captured by the corresponding camera;
   controlling a converting unit to convert the obtained surroundings image captured by each of the at least one camera into a birds-eye view corresponding to each of the at least one camera;
   determining whether or not a rightmost road marker or a leftmost road marker appears in at least one birds-eye view;
   determining a panorama area according to at least the rightmost road marker or the leftmost road marker when a rightmost road marker or a leftmost road marker appears in at least one birds-eye view, determining a detection area of the at least one birds-eye view according to whether or not one or more road markers exclusive the rightmost road marker and the leftmost road marker appear in the panorama area; comparing the distance information of each two adjacent pixels of the detection area, determining a distance difference between the distances indicated by the two adjacent pixels is more than a preset range, and further determining whether or not the number of the determined two adjacent pixels is more than a preset value, to determine whether or not one or more objects appear in the detection area of the at least one birds-eye view;
   obtaining the humidity of air detected by a humidity sensor when one or more objects appear in the detection area of the at least one birds-eye view; and
   determining the at least one birds-eye view when the obtained humidity of air is greater than the preset humidity value, determine at least one camera corresponding to the at least one birds-eye view, and controlling a driving device to turn on at least one pair of lights corresponding to the determined at least one camera.

16. The storage medium as described in claim 15, wherein the method further comprises:
   determining a geometry constructed by the rightmost road marker, the leftmost road marker, and two lines connected between the rightmost road marker and the leftmost road marker when the rightmost road marker and the leftmost road marker appear in at least one birds-eye view, determining the area of the geometry; determining a side perpendicular to the geometry, determining a high of the side, and further determining that the panorama area is equal to the area of the geometry multiplied by the high of the side.

17. The storage medium as described in claim 15, wherein the method further comprises:
   determining a geometry constructed by the rightmost road marker, the leftmost side of the birds-eye view, and two lines connected between the rightmost road marker and the leftmost side of the birds-eye view when the rightmost road marker appears in at least one birds-eye view, determining the area of the geometry; determine a side perpendicular to the geometry, determining a high of the side, and further determining that the panorama area is equal to the area of the geometry multiplied by the high of the side.

18. The storage medium as described in claim 15, wherein the method further comprises:
   determining a geometry constructed by the leftmost road marker, the rightmost side of the birds-eye view, and two lines connected between the leftmost road marker and the rightmost side of the birds-eye view when the leftmost road marker appears in at least one birds-eye view, determining the area of the geometry; determining a side perpendicular to the geometry, determine a high of the side, and further determining that the panorama area is equal to the area of the geometry multiplied by the high of the side.

19. The storage medium as described in claim 15, wherein the method further comprises:
   determining that the detection area of the at least one birds-eye view is the panorama view without the one or more road marks exclusive the rightmost road marker and the leftmost road marker when one or more road marks exclusive the rightmost road marker and the leftmost road marker appear in the panorama view.

20. The storage medium as described in claim 15, wherein the method further comprises:
   determining that the detection area of the at least one birds-eye view is the panorama view when no road mark exclusive the rightmost road marker and the leftmost road marker appears in the panorama view.

* * * * *